(12) United States Patent
van Dijk

(10) Patent No.: US 8,215,661 B2
(45) Date of Patent: Jul. 10, 2012

(54) STROLLER

(75) Inventor: John Gert Til van Dijk, Helmond (NL)

(73) Assignee: Cosco Management, Inc., Wilmington, DE (US)

( * ) Notice: Subject to any disclaimer, the term of this patent is extended or adjusted under 35 U.S.C. 154(b) by 439 days.

(21) Appl. No.: 12/480,594

(22) Filed: Jun. 8, 2009

(65) Prior Publication Data
US 2009/0309335 A1 Dec. 17, 2009

(30) Foreign Application Priority Data

Jun. 13, 2008 (NL) .................................. 1035581

(51) Int. Cl.
*B62B 7/00* (2006.01)
(52) U.S. Cl. ......... 280/642; 280/648; 280/647; 280/655
(58) Field of Classification Search .................. 280/650, 280/658, 647, 642, 655, 643, 648, 654, 657, 280/47.3
See application file for complete search history.

(56) References Cited

U.S. PATENT DOCUMENTS

| 5,743,671 A | 4/1998 | Williams |
| 5,979,928 A * | 11/1999 | Kuo .............. 280/642 |
| 6,339,862 B1 * | 1/2002 | Cheng .............. 280/647 |
| 6,443,479 B2 * | 9/2002 | Huang .............. 280/642 |
| 6,478,328 B1 * | 11/2002 | Yeh et al. .............. 280/650 |
| 6,739,616 B2 * | 5/2004 | Lin .............. 280/642 |
| 6,877,760 B2 * | 4/2005 | Wang .............. 280/642 |
| 6,910,709 B2 * | 6/2005 | Chen .............. 280/642 |
| 7,021,650 B2 * | 4/2006 | Chen .............. 280/642 |
| 7,281,732 B2 * | 10/2007 | Fox et al. .............. 280/642 |

FOREIGN PATENT DOCUMENTS

| EP | 0595096 | 5/1994 |
| EP | 0646513 | 4/1995 |
| EP | 1086876 | 3/2001 |
| EP | 1491422 | 12/2004 |

OTHER PUBLICATIONS

International Search Report dated Feb. 24, 2009, for Netherlands Application NL 1035581.

* cited by examiner

*Primary Examiner* — Hau Phan
(74) *Attorney, Agent, or Firm* — Barnes & Thornburg LLP

(57) ABSTRACT

A stroller at least comprises a collapsible frame, which is provided with wheels near a first side and which is provided with a push member on a side remote from the wheels. The stroller further comprises at least one locking device for locking the frame in an unfolded position, as well as at least first and second actuating devices, which locking device can be unlocked in use by operating the two actuating devices, after which the collapsible frame can be collapsed from the unfolded position to a collapsed position. The first actuating device is slidable from a position in which it blocks the second actuating device to a releasing position, in which releasing position the second actuating device is slidable to an unlocking position, in which the locking device is unlocked.

18 Claims, 6 Drawing Sheets

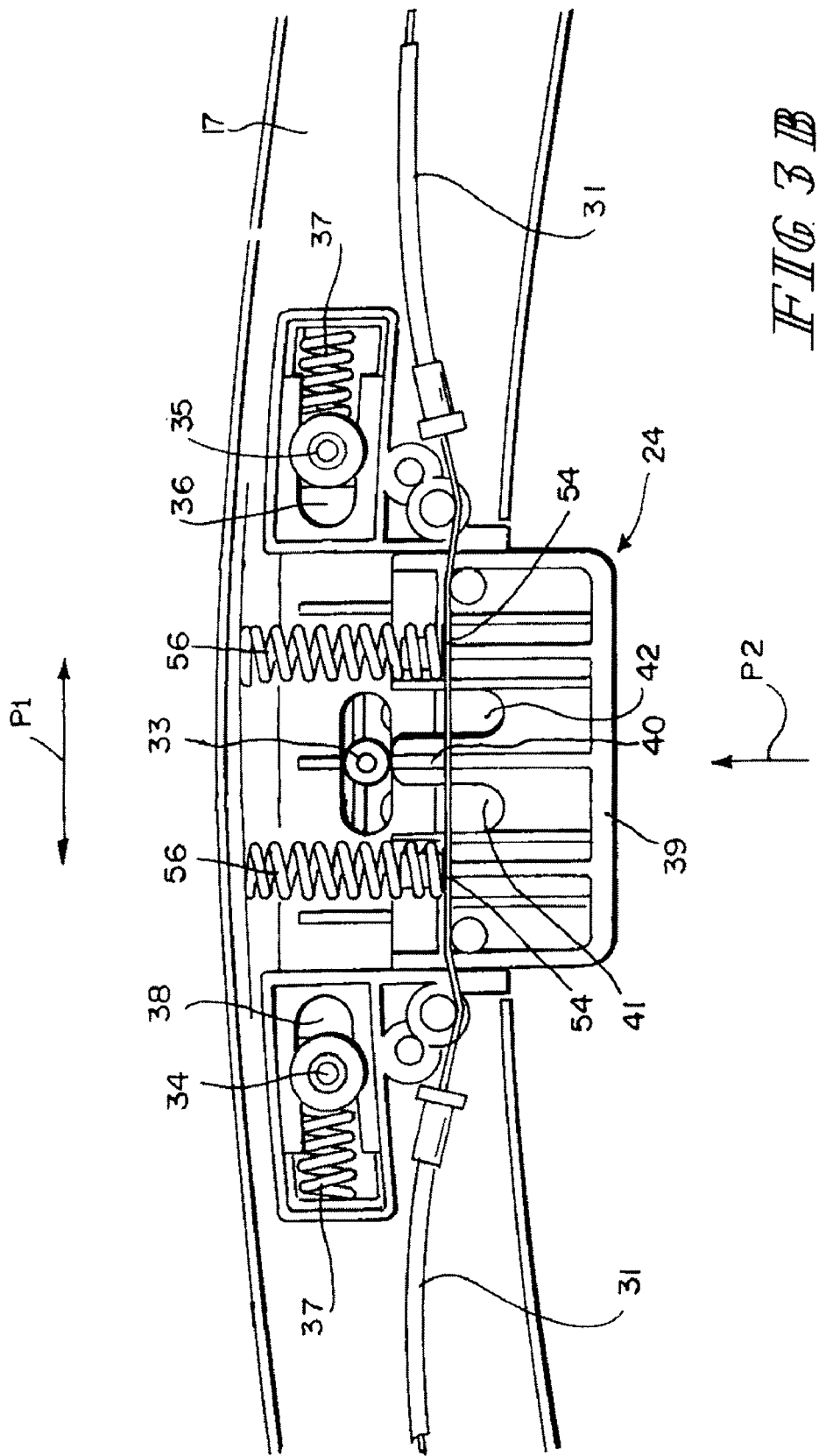

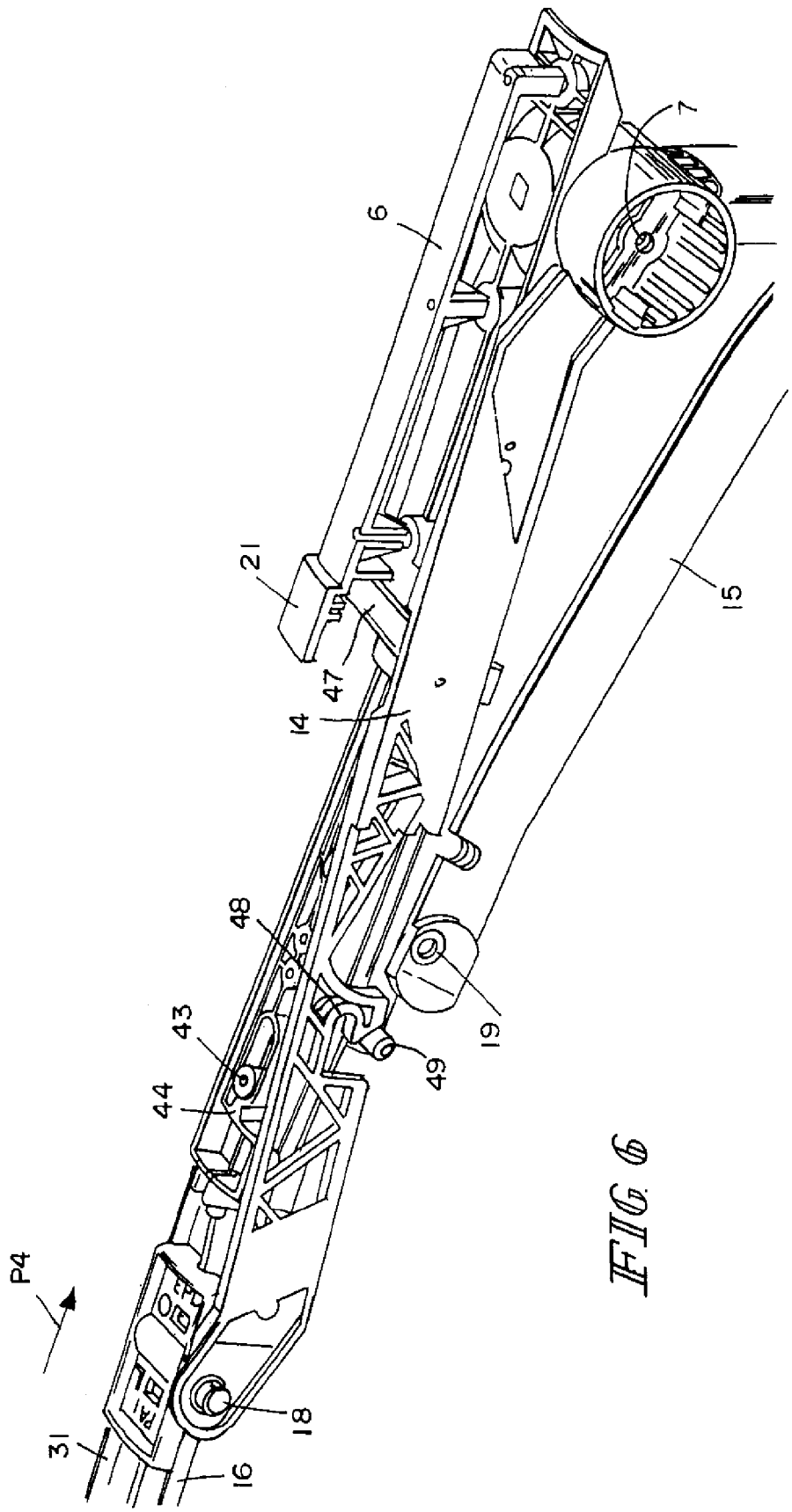

STROLLER

BACKGROUND

The invention relates to a stroller at least comprising a collapsible frame, which is provided with wheels near a first side and which is provided with a push member on a side remote from the wheels, which stroller further comprises at least one locking device for locking the frame in an unfolded position, as well as at least first and second actuating devices, which locking device can be unlocked in use by operating the two actuating devices, after which the collapsible frame can be collapsed from the unfolded position to a collapsed position.

With such a stroller, which is known from European patent application EP-A2-1 491 422, the push member comprises two rods extending at least substantially parallel to each other and a push bar extending between said rods. The first actuating device is located in the push bar, whilst the second actuating device is located in one of the rods. To unlock the locking mechanism, a user will operate the first actuating device with one hand whilst simultaneously operating the second actuating device with the other hand.

By using two actuating devices to be separately operated it is ensured in a relatively simple manner that a stroller will not collapse undesirably. A drawback of the stroller that is known from EP-A2-1 491 422 is that the user needs both hands for separately operating the actuating devices, so that the user will not have a hand free for holding the child.

SUMMARY

The object of the invention is to provide a stroller which comprises at least two actuating devices for unlocking the locking device, whilst the user will have at least one hand free when operating the actuating devices.

This object is accomplished with the stroller according to the invention in that the first actuating device is slidable from a position in which it blocks the second actuating device to a releasing position, in which releasing position the second actuating device is slidable to an unlocking position, in which the locking device is unlocked.

The user can move the first actuating device from the blocking position to the releasing position with one hand, after which the second actuating device is slidable to the unlocking position with the same hand. Since two actuating devices must be moved, accidental unlocking of the locking device is prevented in a simple manner.

As a result of the two sliding movements of the actuating devices, a simple and clear operation is realised.

One embodiment of the stroller according to the invention is characterised in that the first actuating device is slidable to two releasing positions on either side of the blocking position.

Since the first actuating device can thus be moved to a position on one side and on the other side of the blocking position, the user need not think about the direction in which the first actuating device is to be moved. In addition, the first actuating device is thus suitable for left-handed as well as for right-handed people, and can be operated in a manner suitable for both.

Another embodiment of the stroller according to the invention is characterised in that the second operating device is slidable in a direction substantially transversely to the direction in which the first operating device is slidable.

Said two operating directions extending substantially transversely to each other further ensure that accidental operation of the two actuating devices will not take place. The second actuating device can at least partially be inserted into the first actuating device in a simple manner.

Another embodiment of the stroller according to the invention is characterised in that the two actuating devices are disposed within the push member.

The user's hands rest on said push member when pushing the stroller ahead. The actuating devices are easy to operate from this position.

Yet another embodiment of the stroller according to the invention is characterised in that the stroller has a seat supported by the frame, whilst the locking device comprises locking mechanisms disposed on either side of the seat, which locking mechanisms can both be unlocked by means of the second actuating device.

Usually a stroller frame is substantially mirror symmetrical with respect to the seat, with a hinge member being disposed on either side of the seat. Near each hinge member one of the locking mechanisms may be provided in a simple manner, which locking mechanisms can both be unlocked by means of the same second actuating device. The actuating devices are preferably disposed on the push bar that extends between the legs of the push member.

According to another possibility, however, the two legs of the push member are each provided with a single push bar connected to a leg. Each push bar may be provided with said first and said second actuating device.

Yet another embodiment of the stroller according to the invention is characterised in that the stroller is provided with a brake mechanism for blocking at least one wheel, which brake mechanism can be operated from the same side of the stroller as the actuating devices.

In this way a user can simply operate the brake mechanism first and then the actuating devices.

Yet another embodiment of the stroller according to the invention is characterised in that at least one of the actuating devices can be operated against spring force.

In this way a force needs to be exerted for operating the actuating device, so that the actuating device will not be unintentionally operated.

Yet another embodiment of the stroller according to the invention is characterised in that the locking device is provided with at least one slide which is movable against spring force, and also with a cable connected to said slide, one end of which cable remote from the slide cooperates with the second actuating element.

Such a locking device and an actuating device co-operating therewith are relatively easy to manufacture.

BRIEF DESCRIPTIONS OF THE DRAWINGS

The device will now be explained in more detail with reference to the drawings, in which:

FIGS. 3A and 3B are a sectional view and a larger-scale sectional view, respectively, of the push member of FIG. 2;

FIGS. 4-6 are perspective views of the locking mechanisms of the stroller shown in FIGS. 1A and 1B in a locked position and two unlocked positions, respectively.

DETAILED DESCRIPTION

Like parts are indicated by the same numerals in the Figs.

Figure 1:
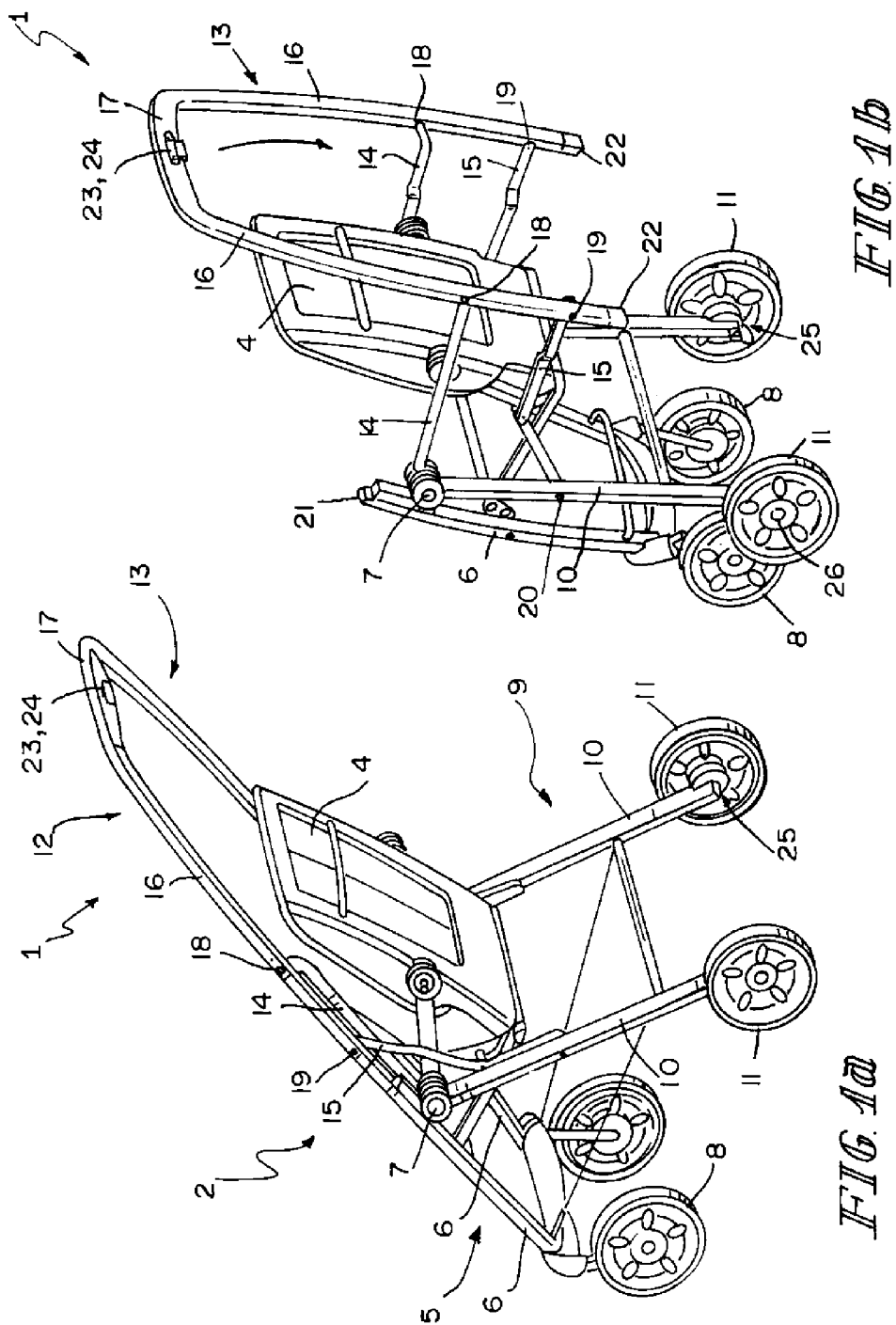
FIGS. 1A and 1B are perspective views of a stroller according to the present disclosure in an unfolded position and in a collapsed position, respectively.

FIGS. 1A and 1B show a stroller 1 according to the invention, which comprises a frame 2, a seat 3 supported by the frame 2 and a backrest 4, which is pivotally connected to the seat 3. The backrest 4 of the stroller 1 is adjustable from a position in which the child takes up an upright position to a more reclined position. The frame 2 comprises a first frame part 5, which comprises two rods 6 extending substantially parallel to each other. Each rod 6 is pivotally connected to a hinge 7 near one end 21 and provided with a front wheel 8 on a side remote from the hinge 7. The frame 2 further comprises a second frame part 9, which comprises two rods 10 extending substantially parallel to each other, each rod being connected to the hinge 7 with one end and being provided with a rear wheel 11 on a side remote from the hinge 7.

The frame 2 further comprises a third frame part 12, which comprises a U-shaped push bracket 13, as well as to pairs of connecting rods 14, 15. The push bracket 13 comprises two rods 16 extending substantially parallel to each other, which are connected at one end by a push bar 17 extending transversely between the rods 16. Each rod 16 is pivotally connected to a first connecting rod 14 by means of a pivot pin 18 and to a second connecting rod 15 by means of a pivot pin 19. The connecting rods 14, 15 are pivotally connected to the second frame part on sides remote from the pivot pin 18, 19 via the hinge 7 and the pivot pin 20, respectively.

As FIG. 1A clearly shows, the rods 6 and the rods 16 are in line with each other in the unfolded position of the stroller 1, with an end 21 of the rod 6 being positioned opposite an end 22 of the rod 16.

The stroller 1 according to the invention further comprises a locking device comprising two locking mechanisms, as well as two actuating devices 23, 24 for operating the locking mechanisms. The locking mechanisms and the actuating devices will be explained in more detail yet hereinafter.

The stroller 1 is provided with a brake mechanism 25, by means of which the two rear wheels 11 can be simultaneously blocked against rotation about axes of rotation 26. The brake mechanism 25 further comprises means for unblocking the wheels 11. Such a brake mechanism 25 is known per se and will not be explained in more detail herein.

Figure 2:
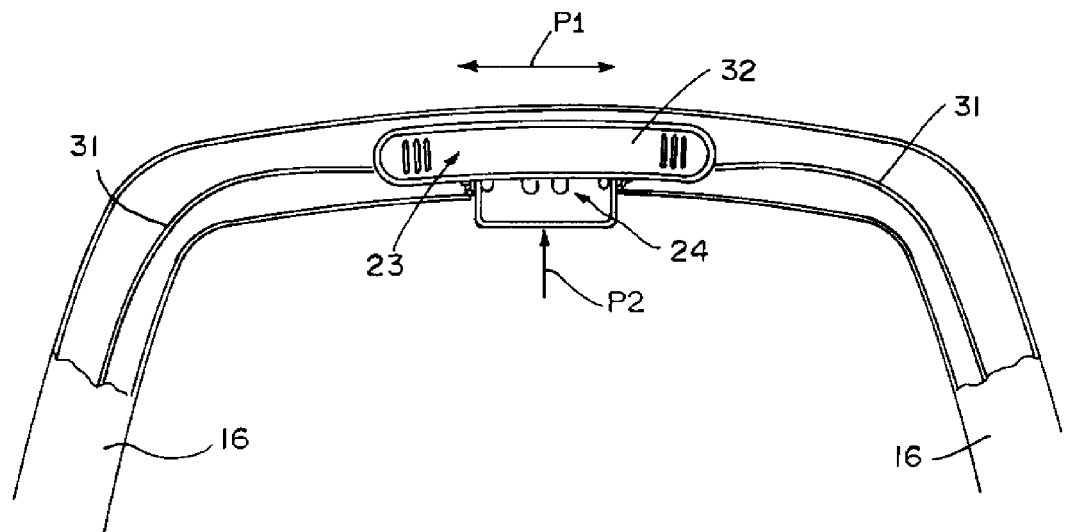
FIG. 2 is a view of a push member of the stroller shown in FIGS. 1A and 1B.

FIG. 2 shows a detail of the push bracket 13 of the stroller 1 shown in FIGS. 1A and 1B. The push bar 17 is provided with a first actuating device 23, which is slidable in the directions indicated by the double arrow P1, and a second actuating device 24, which is slidable in the direction indicated by the arrow P2. Connected to the second actuating device 24 are cables 31, which cables are in turn connected, at their ends remote from the second actuating device 24, to locking mechanisms located near ends 22 of the rods 16 (see FIGS. 4-6).

Figure 3A:
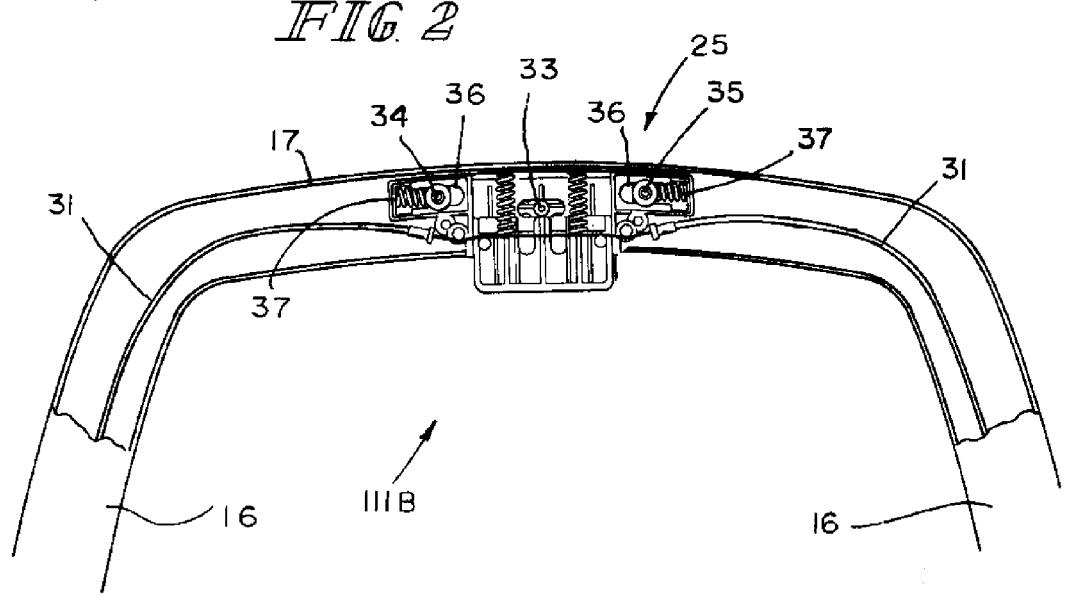

As FIGS. 3A and 3B clearly show, the first actuating device 23 is provided with a slide 32, which comprises three pins 33, 34, 35 extending transversely to the plane of the drawing. The pins 34, 35 located on either side of the pin 33 are slidably positioned in slots 36 formed in the push bar 17. This actuating device 23 is further provided with springs 37, by means of which the slide 32 is held in the second position, in which it blocks the second actuating device. As is clearly shown in FIG. 3B, the second actuating device 24 is provided with a slide 39, which is provided, on a side facing the pin 33, with a projection 40, which abuts against the pin 33. Located on either side of the projection 40 are recesses 41, 42, and on either side thereof bearing surfaces 54 are located, against which the cables 31 abut. The second actuating device 24 further comprises two springs 56, which force the slide 39 into the position shown in FIG. 3B.

The operation of the first and second actuating devices 23, 24 is as follows. The slide 32 is moved to the left or the right, as desired, in the direction indicated by the arrow P1, by a user. As a result, the pin 33 is positioned opposite the recesses 41 or 42. Said movement of the slide 32 takes place against the spring force of the springs 37, so that the slide 32 will take up the starting position shown in FIG. 2 again when a user releases the slide 32. When a user moves the slide 32 and holds it, however, with the pin 33 being positioned opposite the recess 41 or 42, the user can subsequently move the slide 39 of the second actuating device 24 in the direction indicated by the arrow P2 against the spring force of the springs 56. The cables 31 abutting against the bearing surfaces are at the same time moved in the direction indicated by the arrow P2, as a result of which a pulling force is exerted on the cables 31, which causes the locking mechanisms on either side of the stroller to be unlocked. Said unlocking will be explained in more detail below with reference to FIGS. 4-6. As soon as the user releases the actuating devices 23, 24, the slide 39 will be moved in the opposite direction of the arrow P2 to the position shown in FIG. 3B under the influence of the spring force of the springs 56, whereupon the slide 32 will be moved to the position in which it blocks the second actuating device 24 as a result of the action of the springs 37. For a user the operation of the actuating devices is easy. When a user tries to depress the second actuating device 24 first, the projection 40 that abuts against the pin 33 will prevent this. Only after a user has moved the slide 32 of the first actuating device 23 from the position in which it blocks the second actuating device can 24 to the releasing position the second actuating device can be moved to the unlocking position, in which position the locking devices have been unlocked by the cables 31.

Figure 4:
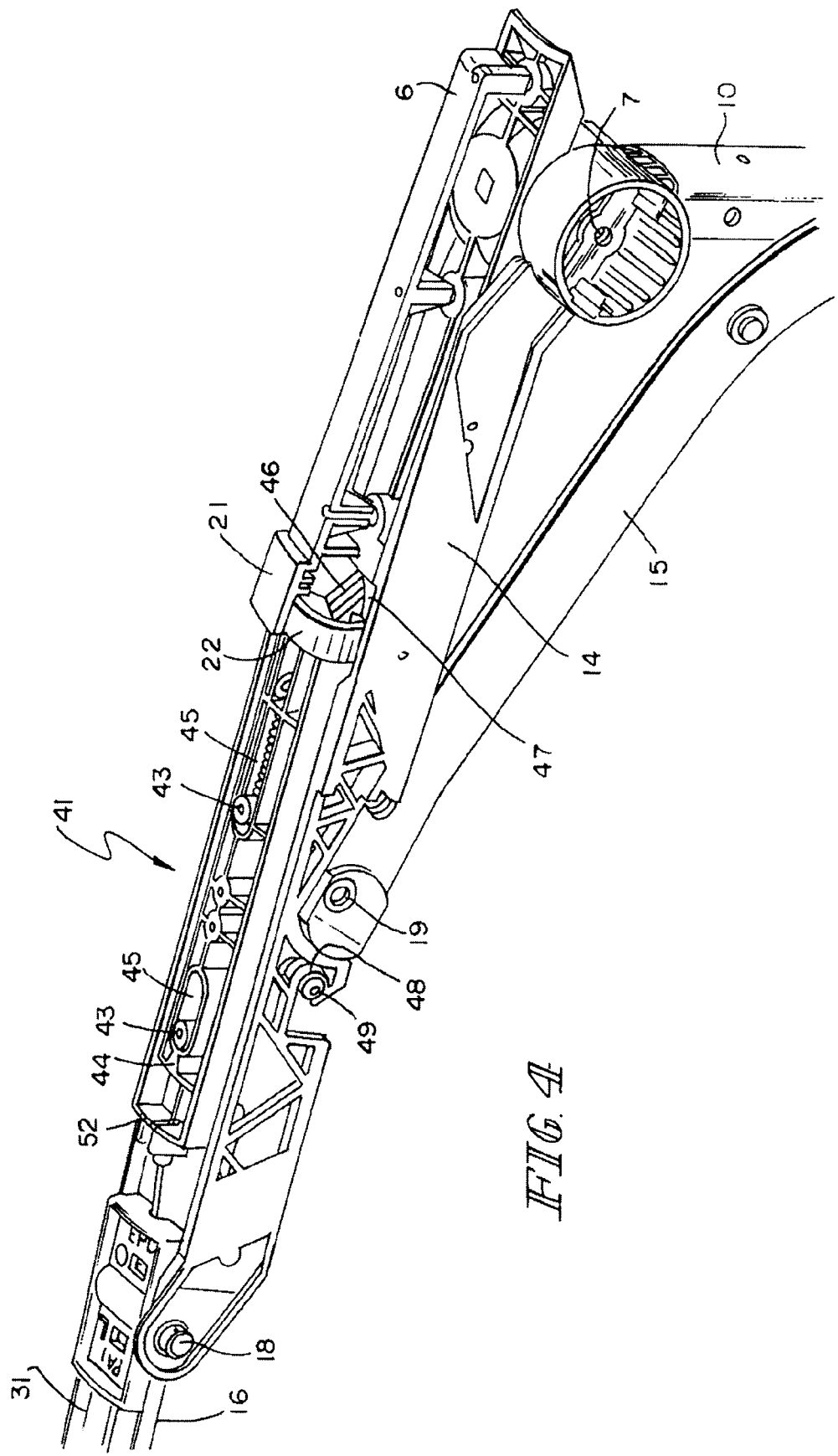
Figure 5:
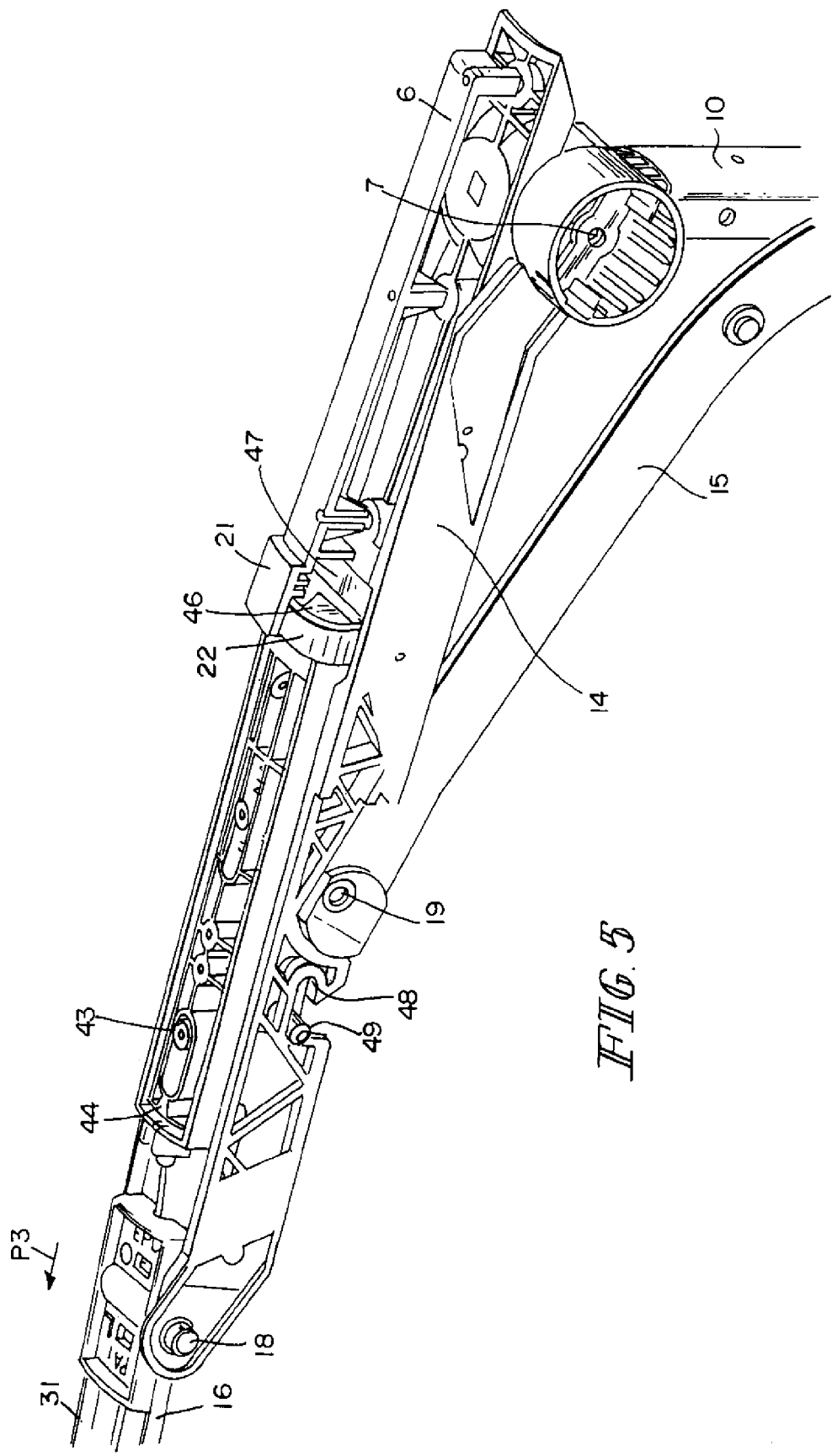

FIGS. 4-6 show various positions of the rods 6, 16, the connecting rods 14, 15 and the locking mechanism 50 disposed within the rods 6, 16. The locking mechanism 50 comprises a holder 52 located within the rod 16 and guide pins 43 disposed in the holder 52. Accommodated in the holder 52 is a slide 44, which is provided with slots 45 surrounding the pins 43. An end 46 facing the rod 6 of the slide 44 extends into the end 21 of the rod 6 in the locked position of the rods 6, 16 shown in FIG. 4, and abuts against a bearing surface 47 of the rod 6 at the bottom side. The rod 16 is thus connected to the rod 6. Near the pivot pin 19, the connecting rod 14 is provided with a recess 48, in which a pin 49 connected to the slide 44 is accommodated. The pin 49 accommodated in the recess 48 prevents the connecting rod 14 from pivoting about the pivot pin 18 with respect to the rod 16.

The end 46 of the rod 16 positioned in the end 21 of the rod 6 and the pin 49 positioned in the recess 48 of the connecting rod 14 provide a stable double connection. This effect is enhanced in that the connections are spaced relatively far apart and extend between various rods 6, 14, 16.

The cable 31 which extends from the second actuating device 24 is connected to the slide 44 on a side remote from the actuating device 24.

When the two actuating devices 23, 24 are operated, the slide 44 will be moved in the direction indicated by the arrow P3 by the cable 31, as a result of which the end 46 of the slide 44 will be moved out of the end 21 of the rod 6. At the same time, the pin 49 is moved out of engagement with the recess 48 of the connecting rods 14 (see FIG. 5). It is then possible to pivot the rods 6, 16 and the connecting rods 14, 16 about the respective pivot pins 7, 18, 19, 20, via the position shown in FIG. 6, to the position shown in FIG. 1B, in which the stroller 1 is partially collapsed. From the position shown in FIG. 1B, the stroller can be collapsed even further by pivoting the rods 14, 15 about the pivot pins 7, 20 towards the rods 10. One the rods 6, 16 have been pivoted to the position shown in FIG. 6, the user can release the actuating devices 23, 24, as a result of which the slide 44 will be moved in a direction indicated by the arrow P4, opposite the direction indicated by the arrow P3, so that the slide 44 will take up the same position as in FIG. 4.

It is also possible to provide each rod 16 with its own push bar 17, each push bar being provided with first and second actuating devices, each actuating their own locking mechanism. It is also possible to provide the stroller with one locking mechanism, which is unlocked by means of the actuating device.

It is also possible to mount the first and second actuating devices at another position in the frame instead of in the push member, for example at a position near the seat.

The invention claimed is:

1. A stroller comprising
a collapsible frame including wheels positioned near a first side and a push member coupled to the wheels on a second side spaced apart from the first side,
a locking device coupled to the collapsible frame and configured to lock the collapsible frame in an unfolded position, and
first and second actuating devices coupled to the push member, wherein the locking devices are unlocked by operating the first and second actuating devices to cause the collapsible frame to be unlocked and collapsed from the unfolded position to a collapsed position after operation of the first and second actuating devices and the first actuating device is slidable relative to the second actuating device from a position in which the first actuating device blocks movement of the second actuating device to a releasing position in which the second actuating device is freed to slide generally perpendicular to the first actuating device to an unlocking position to cause the locking device to be unlocked.

2. The stroller of claim 1, wherein the first actuating device is slidable to two releasing positions on either side of the blocking position.

3. The stroller of claim 1, wherein the two actuating devices are disposed within the push member.

4. The stroller of claim 1, wherein the push member is U-shaped, the which U-shaped push member comprises two legs and a push bar extending between said legs and being connected to at least one of said legs, and the push bar is provided with said actuating devices.

5. The stroller of claim 4, wherein the stroller has a seat supported by the frame, the locking device comprises locking mechanisms disposed on each side of the seat, and the locking mechanisms can both be unlocked in response to operating the second actuating device.

6. The stroller of claim 1, further comprising a brake mechanism coupled to the frame and configured to block at least one wheel and the brake mechanism can be operated from the same side of the stroller as the first and second actuating devices.

7. The stroller of claim 1, wherein one of the actuating devices can be operated against a spring force provided by a spring coupled to the push member.

8. The stroller of claim 1, wherein the locking device is provided with at least one slide which is movable against a spring force provided by a spring coupled to the collapsible frame and a cable connected to said slide, one end of the cable is remote from the slide and is coupled to the second actuating element to move therewith.

9. A stroller comprising
a front wheel,
a rear wheel,
a collapsible frame including a first frame part coupled to the front wheel, a second frame part coupled to the rear wheel and to the first frame part to pivot relative to the first frame part, and a third frame part coupled to the second frame part to move relative to the first and second frame parts, the collapsible frame being movable between an unfolded position and a collapsed position,
a locking device coupled to the collapsible frame and configured to lock the collapsible frame in the unfolded position,
a first actuating device coupled to the third frame part to slide in a first lateral direction from a blocked position to a first freed position, and
a second actuating device coupled to the third frame part to slide in a longitudinal direction that is generally perpendicular to the first lateral direction when the first actuating device is in the first freed position, the second actuating device moves from a locked position in which the locking device causes the collapsible frame to be locked in the unfolded position to an unlocked position that causes the locking device to allow the collapsible frame to be collapsed to the collapsed position.

10. The stroller of claim 9, wherein the first actuating device is movable in a second lateral direction that is opposite the first lateral direction from the blocked position to a second freed position and the second actuating device is movable from the locked position to the unlocked position when the first actuating device is in the second freed position.

11. The stroller of claim 9, wherein the first and second actuating devices are disposed in the third frame part.

12. The stroller of claim 9, wherein the third frame part includes a U-shaped push member and the first and second actuating devices are coupled to the push member.

13. The stroller of claim 9, wherein the first actuating device includes a spring that provides a bias force that urges the first actuating device into the blocked position.

14. The stroller of claim 9, wherein the second actuating device includes a spring that provides a bias force that urges the second actuating device into the locked position.

15. The stroller of claim 14, wherein the first actuating device includes a spring that provides a bias force that urges the first actuating device into the blocked position.

16. The stroller of claim 15, wherein the first actuating device further includes a slide and a pin coupled to the slide to move therewith and the slide is coupled to the third frame part to slide from the blocked position to the first freed position in response to application of a force to the slide by a caregiver that overcomes the bias force.

17. The stroller of claim 16, wherein the second actuating device includes a slide and a projection coupled to the slide to move therewith, the slide is formed to include a recess that receives the pin of the first actuating device therein when the first actuating device is in the first freed position and the second actuating device is in the unlocked position.

18. The stroller of claim 17, wherein the pin of the first actuating device engages the projection included in the second actuating device to block movement of the second actuating device when the first actuating device is in the blocking position and the second actuating device is in the locked position.

* * * * *